(12) United States Patent
Ohtsuka et al.

(10) Patent No.: US 11,624,004 B2
(45) Date of Patent: Apr. 11, 2023

(54) LIQUID COMPOSITION, COATING FILM, AND METHOD FOR PRODUCING LIQUID COMPOSITION

(71) Applicant: DAIKIN INDUSTRIES, LTD., Osaka (JP)

(72) Inventors: Kazuhiro Ohtsuka, Osaka (JP); Masahiro Tomita, Osaka (JP); Fujimaru Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 652 days.

(21) Appl. No.: 16/483,857

(22) PCT Filed: Feb. 9, 2018

(86) PCT No.: PCT/JP2018/004692
§ 371 (c)(1),
(2) Date: Aug. 6, 2019

(87) PCT Pub. No.: WO2018/147431
PCT Pub. Date: Aug. 16, 2018

(65) Prior Publication Data
US 2020/0010724 A1    Jan. 9, 2020

(30) Foreign Application Priority Data

Feb. 9, 2017    (JP) .............................. JP2017-022260

(51) Int. Cl.
| C09D 181/08 | (2006.01) |
| C09D 127/12 | (2006.01) |
| C09C 1/28 | (2006.01) |
| C09D 7/61 | (2018.01) |

(52) U.S. Cl.
CPC .............. *C09D 181/08* (2013.01); *C09C 1/28* (2013.01); *C09D 7/61* (2018.01); *C09D 127/12* (2013.01)

(58) Field of Classification Search
CPC ...... C09C 1/28; C09D 127/12; C09D 181/08; C08L 27/12
See application file for complete search history.

(56) References Cited

U.S. PATENT DOCUMENTS

2012/0295117 A1    11/2012    Iizuka et al.

FOREIGN PATENT DOCUMENTS

| JP | 5-59300 A | 3/1993 |
| JP | 2013-185070 A | 9/2013 |
| WO | 2011/093495 A1 | 8/2011 |

OTHER PUBLICATIONS

Extended European Search Report dated Apr. 9, 2020, issued by the European Patent Office in application No. 18750886.6.
International Preliminary Report on Patentability and Translation of Written Opinion, dated Aug. 13, 2019 from the International Bureau in counterpart International application No. PCT/JP2018/004692.
Sumiaki Yamasaki, et al., "Development of the organic-inorganic hybrid super-hydrophilic layer", FujiFilm Research & Development, 2010, pp. 29-32, No. 55.
Tsutomu Mizutani, et al., "The Development of Nanocomposite Emulsion and the Application to the Environmentally Safe Architectural Paint", Polymers, 2006, pp. 955, vol. 55, No. 12.
International Search Report for PCT/JP2018/004692 dated May 15, 2018 [PCT/ISA/210].

*Primary Examiner* — Vickey Nerangis
(74) *Attorney, Agent, or Firm* — Sughrue Mion, PLLC

(57) ABSTRACT

A liquid composition that can provide a film having excellent antifogging performance and weather resistance. The liquid composition contains nanocomposite particles. The nanocomposite particles contain metal particles and a perfluorocarbon sulfonic acid resin or a sulfonic acid salt resin thereof. The perfluorocarbon sulfonic acid resin has an equivalent weight of 550 to 800. The nanocomposite particles have an average particle size of 15 to 100 nm.

14 Claims, No Drawings

LIQUID COMPOSITION, COATING FILM, AND METHOD FOR PRODUCING LIQUID COMPOSITION

CROSS REFERENCE TO RELATED APPLICATIONS

This application is a National Stage of International Application No. PCT/JP2018/004692 filed Feb. 9, 2018, claiming priority based on Japanese Patent Application No. 2017-022260 filed Feb. 9, 2017.

TECHNICAL FIELD

The invention relates to liquid compositions suitably used for coating articles, films obtainable from the liquid compositions, and methods for producing a liquid composition.

BACKGROUND ART

Smaller particles of a substance exhibit behaviors different from the properties of the original solid, which leads to attention on compositions containing nanoparticles having a particle size of nanometer scale (several nanometers to several hundreds of nanometers) dispersed therein.

Such compositions are called nanocomposites and used for optical materials, light-shielding materials, high-strength materials, high-heat-resistant materials, incombustible materials, and color filters. Nanoparticles of polymers are also being developed, but nanoparticles of polymers may need to have heat resistance for the use in high-temperature environments in some cases.

For example, in order to improve the heat resistance, Patent Literature 1 discloses nanocomposite particles containing a perfluorocarbon sulfonic acid polymer obtainable by performing a surface treatment including mixing a reaction material liquid that contains (a) core silica particles having an average particle size of 5 to 200 nm, (b) an alkoxysilane, (c) a perfluorocarbon sulfonic acid polymer, and (d) a reaction solvent, with ammonia water in the form of $NH_3$ in an amount of 1 mL or more per 1 mL of the alkoxysilane (b) to cause hydrolysis of the alkoxysilane, thereby surface-treating the core silica particles.

CITATION LIST

Patent Literature

Patent Literature 1: JP 2013-185070 A

SUMMARY OF INVENTION

Technical Problem

Films coating outdoor articles need to have weather resistance. Molded articles formed of glass, for example, suffer dew condensation on their surfaces at temperatures equal to or lower than the dew point. Thus, films coating such molded articles also need to have antifogging performance. Nevertheless, Patent Literature 1 examines only the heat resistance of the nanocomposite particles and examines neither the antifogging performance nor the weather resistance of films obtainable from a dispersion containing the nanocomposite particles. Even the use of the nanocomposite particles disclosed in Patent Literature 1 results in a failure in forming a film having excellent antifogging performance.

In view of the above state of the art, the invention aims to provide a liquid composition that can provide a film having excellent antifogging performance and weather resistance. The invention also aims to provide a film having excellent antifogging performance and weather resistance and a method for producing the liquid composition.

Solution to Problem

The inventors performed studies for solving the above issues to find that a liquid composition containing nanocomposite particles that have a specific average particle size and that contain a specific perfluorocarbon sulfonic acid resin or a sulfonic acid salt resin thereof and metal particles can provide a film having excellent weather resistance and antifogging performance.

In other words, the invention relates to a liquid composition containing nanocomposite particles, the nanocomposite particles containing metal particles and a perfluorocarbon sulfonic acid resin or a sulfonic acid salt resin thereof, the perfluorocarbon sulfonic acid resin having an equivalent weight of 550 to 800, the nanocomposite particles having an average particle size of 15 to 100 nm.

The perfluorocarbon sulfonic acid resin is preferably a copolymer containing:
a polymerized unit represented by $-(CF_2-CFZ)-$, wherein Z is H, Cl, F, or a C1-C3 perfluoroalkyl group; and
a polymerized unit represented by $-(CF_2-CF(-O-(CF_2)_m-SO_3H))-$, wherein m is an integer of 1 to 12.

The liquid composition of the invention preferably further contains an alcohol.

The liquid composition of the invention is preferably a coating material.

The invention also relates to a film containing the above liquid composition.

The invention also relates to a film containing nanocomposite particles, the nanocomposite particles containing metal particles and a perfluorocarbon sulfonic acid resin or a sulfonic acid salt resin thereof, the film having a mass ratio (F/S) of a fluorine element content to a sulfur element content of 10 to 50, the mass ratio being determined by energy dispersive X-ray spectroscopy.

The invention also relates to a method for producing a liquid composition including forming a liquid composition containing nanocomposite particles by mixing metal particles, a perfluorocarbon sulfonic acid resin or a sulfonic acid salt resin thereof, an alkoxysilane, and at least one catalyst selected from the group consisting of solid acid catalysts other than the perfluorocarbon sulfonic acid resin and the metal particles, acid compounds, and alkali compounds, the perfluorocarbon sulfonic acid resin having an equivalent weight of 550 to 800.

In the formation, preferably, the alkoxysilane is hydrolyzed and the metal particles are surface-treated with the perfluorocarbon sulfonic acid resin or the sulfonic acid salt resin thereof.

The formation is preferably performed in an alcohol.

The nanocomposite particles preferably contain the metal particles and the perfluorocarbon sulfonic acid resin.

The nanocomposite particles preferably have an average particle size of 15 to 100 nm.

The invention also relates to a method for producing a liquid composition including: forming a liquid composition containing a nanocomposite particle precursor by mixing metal particles, a perfluorocarbon sulfonic acid resin or a sulfonic acid salt resin thereof, an alkoxysilane, and at least one catalyst selected from the group consisting of solid acid catalysts other than the perfluorocarbon sulfonic acid resin and the metal particles, acid compounds, and alkali compounds; and performing ion exchange on the perfluorocarbon sulfonic acid resin in the nanocomposite particle precursor to form a liquid composition containing nanocomposite particles, the perfluorocarbon sulfonic acid resin having an equivalent weight of 550 to 800.

In the formation of the liquid composition containing the nanocomposite particle precursor, preferably, the alkoxysilane is hydrolyzed and the metal particles are surface-treated with the perfluorocarbon sulfonic acid resin or the sulfonic acid salt resin thereof.

The formation of the liquid composition containing the nanocomposite particle precursor is preferably performed in an alcohol.

The nanocomposite particles preferably contain the metal particles and a perfluorocarbon sulfonic acid salt resin.

The nanocomposite particles preferably have an average particle size of 15 to 100 nm.

Advantageous Effects of Invention

The liquid composition of the invention has any of the above structures, and thus can provide a film having excellent antifogging performance and weather resistance. The film of the invention has excellent antifogging performance and weather resistance. The method for producing a liquid composition of the invention can produce a liquid composition that can provide a film having excellent antifogging performance and weather resistance.

DESCRIPTION OF EMBODIMENTS

The invention is described in detail below. The following embodiments are not intended to limit the invention, and may be modified within the spirit of the invention.

The liquid composition of the invention is a liquid composition containing nanocomposite particles. The nanocomposite particles contain metal particles and a perfluorocarbon sulfonic acid resin or a sulfonic acid salt resin thereof. The perfluorocarbon sulfonic acid resin has an equivalent weight of 550 to 800. The nanocomposite particles have an average particle size of 15 to 100 nm.

The above structures of the liquid composition of the invention enable formation of a film having excellent antifogging performance and weather resistance. The film obtainable from the liquid composition of the invention has excellent water resistance and acid resistance. The liquid composition of the invention, when used as a coating material, exhibits excellent adhesion to a substrate to which the coating material is applied.

The metal particles may be of any type of particles containing a metal atom. Examples thereof include simple metal particles, metal oxide particles, metal nitride particles, and metal salts. Examples of the metal include gold, silver, copper, silicon, and boron.

Examples of the metal oxide particles include particles of silica, alumina, iron oxide, or zinc oxide.

Examples of the metal nitride particles include particles of a nitride of gallium, titanium, or lithium.

Examples of the metal salts include silver sulfide, barium carbonate, and strontium carbonate.

The metal particles may be used alone or in combination of two or more thereof.

In order to form a film having excellent antifogging performance, the metal particles are preferably metal oxide particles. In order to be transparent to light, the type of the metal particles is preferably at least one type of metal oxide particles selected from the group consisting of silica particles, iron oxide particles, and zinc oxide particles, more preferably silica particles.

In order to form a film having excellent antifogging performance and weather resistance, the metal particles preferably have an average particle size of 5 to 200 nm, preferably 5 to 100 nm. Metal particles having an average particle size of smaller than 5 nm are likely to aggregate, making it difficult to produce the liquid composition. Metal particles having an average particle size of greater than 200 nm may cause poor dispersion stability of the nanocomposite particles.

The average particle size of the metal particles can be determined by dynamic light scattering or laser diffraction.

The perfluorocarbon sulfonic acid resin is a resin in which a sulfonic acid group (part of which may optionally be in the form of a salt) binds to a perfluorocarbon.

The perfluorocarbon sulfonic acid resin is preferably a copolymer containing a polymerized unit represented by —($CF_2$—CFZ)— (wherein Z is H, Cl, F, or a C1-C3 perfluoroalkyl group) and a polymerized unit represented by —($CF_2$—CF(—O—($CF_2$)$_m$—$SO_3$H))— (wherein m is an integer of 1 to 12). The presence of the perfluorocarbon sulfonic acid resin having the above structure allows the liquid composition of the invention to form a film having excellent antifogging performance and weather resistance. The liquid composition, when used as a coating material, can lead to improved adhesion between a substrate to which the liquid composition is applied and the film.

In order to form a film having excellent antifogging performance and weather resistance and exhibiting excellent adhesion to a substrate, m is preferably an integer of 1 to 6 and Z is preferably F.

The perfluorocarbon sulfonic acid resin is preferably one obtainable by hydrolyzing a perfluorocarbon sulfonic acid resin precursor containing a copolymer of a fluorinated vinyl ether compound represented by the following formula (1) and a fluorinated olefin monomer represented by the following formula (2):

$$CF_2=CF-O-(CF_2)_m-W \qquad (1)$$

(wherein m is an integer of 1 to 12; and W is a functional group which may optionally be converted into —$SO_3$H by hydrolysis);

$$CF_2=CFZ \qquad (2)$$

(wherein Z is H, Cl, F, or a C1-C3 perfluoroalkyl group).

W in the formula (1), i.e., the functional group which may optionally be converted into —$SO_3$H by hydrolysis is preferably $SO_2$F, $SO_2$Cl, or $SO_2$Br. Preferably, m is an integer of 1 to 6. The compound in which m is an integer of 1 to 6 tends to cause a small equivalent weight EW of the perfluorocarbon sulfonic acid resin, improving the antifogging performance.

The perfluorocarbon sulfonic acid resin precursor is preferably one with the formulae (1) and (2) in which W is $SO_2$F and Z is F. In order to form a film having high antifogging performance and weather resistance, more preferably, m is an integer of 1 to 6, W is $SO_2$F, and Z is F.

The perfluorocarbon sulfonic acid resin precursor can be synthesized by a known technique. Examples of known techniques include: a method (solution polymerization) in which, in a polymerization method utilizing a peroxide of a radical generator, a vinyl fluoride compound containing the functional group which may optionally be converted into —$SO_3$H by hydrolysis and gas of a fluorinated olefin such as tetrafluoroethylene (TFE) are charged and dissolved into and reacted in a polymerization solvent such as a fluorine-containing hydrocarbon, whereby the monomers are polymerized; a method (bulk polymerization) in which a vinyl fluoride compound itself serves as a polymerization solvent without the use of a solvent such as a fluorine-containing hydrocarbon, whereby the monomers are polymerized; a method (emulsion polymerization) in which a vinyl fluoride compound and gas of a fluorinated olefin are charged into and reacted in an aqueous solution of a surfactant serving as a medium, whereby the monomers are polymerized; a method (mini-emulsion polymerization or micro-emulsion polymerization) in which a vinyl fluoride compound and gas of a fluorinated olefin are charged into, emulsified in, and reacted in an aqueous solution of a surfactant and a co-emulsifier such as an alcohol, whereby the monomers are polymerized; and a method (suspension polymerization) in which a vinyl fluoride compound and gas of a fluorinated olefin are charged into, suspended in, and reacted in an aqueous solution of a suspension stabilizer, whereby the monomers are polymerized. The precursor used in the present embodiment may be produced by any of these polymerization methods.

The perfluorocarbon sulfonic acid resin precursor produced as described above preferably has a melt index (MI) of 0.05 to 50 g/10 min, more preferably 0.1 to 30 g/10 min, most preferably 0.2 to 20 g/10 min. MI is represented by the mass in grams of a polymer extruded using a melt indexer per 10 minutes at 270° C. and a load of 2.16 kg in conformity with JIS K 7210.

The perfluorocarbon sulfonic acid resin precursor produced as described above is preferably extrusion-molded through a nozzle, a die, or the like using an extruder. This molding may be achieved by any molding method and the resulting molded article may have any shape. In order to increase the treatment speeds in a hydrolysis treatment and an acid treatment to be described later, the molded article is preferably in the form of pellets with a size of 0.5 $cm^3$ or smaller. Alternatively, the precursor may be in the form of powder after the polymerization.

The perfluorocarbon sulfonic acid resin precursor molded as described above is then immersed in a basic reaction liquid for a hydrolysis treatment.

The basic reaction liquid used in the hydrolysis treatment is preferably, but is not limited to, an aqueous solution of an amine compound such as dimethylamine, diethylamine, monomethylamine, or monoethylamine, or an aqueous solution of a hydroxide of an alkali metal or an alkaline earth metal, particularly preferably an aqueous solution of sodium hydroxide or potassium hydroxide. The hydroxide of an alkali metal or an alkaline earth metal is preferably present in an amount of 10 to 30% by mass of the whole reaction liquid, although not limited thereto. The reaction liquid more preferably further contains a swellable organic compound such as methyl alcohol, ethyl alcohol, acetone, or DMSO. The swellable organic compound is preferably present in an amount of 1 to 30% by mass of the whole reaction liquid.

The perfluorocarbon sulfonic acid resin precursor after the hydrolysis treatment in the basic reaction liquid is sufficiently washed with warm water, for example, and then subjected to an acid treatment. The acid used in the acid treatment may be any acid, and is preferably a mineral acid such as hydrochloric acid, sulfuric acid, or nitric acid, or an organic acid such as oxalic acid, acetic acid, formic acid, or trifluoroacetic acid, more preferably a mixture of any of these acids and water. Two or more of these acids may be used together. This acid treatment can protonate the perfluorocarbon sulfonic acid resin precursor and allows this precursor to have —$SO_3H$. The perfluorocarbon sulfonic acid resin obtained by the protonation is dissolvable in a protonic organic solvent, water, and a solvent mixture of both.

The perfluorocarbon sulfonic acid resin has an equivalent weight EW (a dry weight in grams of the perfluorocarbon sulfonic acid resin per equivalent of a proton exchange group) of 550 to 800. The equivalent weight EW of the perfluorocarbon sulfonic acid resin is preferably 560 to 770, more preferably 570 to 750, still more preferably 580 to 730.

The perfluorocarbon sulfonic acid resin having an equivalent weight EW within the above range can improve the antifogging performance of a film obtainable from the liquid composition. Too small an equivalent weight EW may cause easy peeling of the resulting film from a substrate. Too large an equivalent weight EW may cause a failure in leading to excellent antifogging performance.

The equivalent weight EW of the perfluorocarbon sulfonic acid resin can be determined by replacing the proton of the perfluorocarbon sulfonic acid resin by a cation to form a salt and back-titrating the solution of the salt with an alkali solution.

Some of the sulfonic acid groups of the perfluorocarbon sulfonic acid resin may be crosslinked so as to control the water solubility and excessive swellability. Examples of crosslinking techniques include reactions of sulfonic acid groups and the main chain or reactions of sulfonic acid groups, crosslinking of sulfonic acid groups with a high-molecular-weight or low-molecular-weight cross-linking agent, and salt-crosslinking of sulfonic acid groups.

The perfluorocarbon sulfonic acid resin preferably has an equilibrium water absorption of at least 5% by weight, more preferably at least 7% by weight, still more preferably at least 10% by weight, particularly preferably at least 15% by weight. The perfluorocarbon sulfonic acid resin having an equilibrium water absorption of 5% by weight or more can reduce the influence of the use conditions (changes in environmental conditions such as weather and adhesion of contaminants) on the hydrophilicity of the film surface. The upper limit thereof is preferably 50% by weight, more preferably 45% by weight, still more preferably 40% by weight. The perfluorocarbon sulfonic acid resin having an equilibrium water absorption of 50% by weight or less can lead to properties such as stable water resistance and good adhesion to a surface to be coated. When water is present on the film surface due to rain or water sprinkling, the perfluorocarbon sulfonic acid resin within a small EW region has a significantly increased moisture content and thus leads to a much higher stain resistance effect. Such a perfluorocarbon sulfonic acid resin makes the liquid composition more effective for application to outdoor structures such as roofs, outer walls, bridges, steel towers, antennas, surfaces of solar cells, and sunlight reflectors.

The equilibrium water absorption (Wc) of the perfluorocarbon sulfonic acid resin is determined as follows. Specifically, a dispersion of the resin in water and an alcoholic solvent is cast and dried at 160° C. or lower to form a film. This film is left to stand at 23° C. and 50% relative humidity (RH) for 24 hours. Thereafter, the weight of the film is measured and the equilibrium water absorption is calculated.

A sulfonic acid salt resin of the perfluorocarbon sulfonic acid resin (hereinafter, also referred to as a "perfluorocarbon sulfonic acid salt resin") is a salt obtained by replacing a hydrogen ion of a sulfonic acid group by a cation in the perfluorocarbon sulfonic acid resin having an equivalent weight of 550 to 800.

The perfluorocarbon sulfonic acid salt resin has higher water absorbency than the perfluorocarbon sulfonic acid resin, and thus can further improve the antifogging performance.

Examples of the cation to replace a hydrogen ion include metal ions and an ammonium ion. In order to achieve good dispersibility, metal ions are preferred. Examples of the metal ions include $Na^+$, $K^+$, and $Li^+$.

The perfluorocarbon sulfonic acid salt resin is obtainable by performing neutralization or ion exchange on the perfluorocarbon sulfonic acid resin. For example, the perfluorocarbon sulfonic acid salt resin is obtainable by ion exchange performed by bringing an ion-exchange polymer into contact with the perfluorocarbon sulfonic acid resin. The ion-exchange polymer used may be a cation-exchange polymer such as a Na-form ion-exchange polymer or a K-form ion-exchange polymer.

That the perfluorocarbon sulfonic acid salt resin is a sulfonic acid salt of a perfluorocarbon sulfonic acid resin having an equivalent weight of 550 to 800 can be confirmed by protonating the sulfonic acid salt into a sulfonic acid form, replacing the proton by a cation to form a salt, and back-titrating the liquid of the salt with an alkali solution.

The nanocomposite particles contain metal particles and the perfluorocarbon sulfonic acid resin or a sulfonic acid salt resin thereof and have an average particle size of 15 to 100 nm.

The nanocomposite particles having an average particle size within the above range can uniformly disperse in the liquid composition, allowing the resulting film to have excellent antifogging performance and weather resistance and exhibit excellent adhesion to a substrate. The average particle size of the nanocomposite particles is preferably 15 to 80 nm, more preferably 20 to 70 nm, still more preferably 25 to 60 nm.

The average particle size of the nanocomposite particles is a value determined by dynamic light scattering.

In order to lead to excellent antifogging performance, weather resistance, and adhesion to a substrate, the nanocomposite particles preferably contain 0.5 to 100 g, more preferably 2 to 50 g, of the perfluorocarbon sulfonic acid resin or the sulfonic acid salt resin thereof per 1 g of the metal particles.

The nanocomposite particles preferably contain a siloxane bond (Si—O—Si bond). The liquid composition of the invention can suitably be produced by a production method using an alkoxysilane to be described later. The liquid composition produced by the method using an alkoxysilane to be described later typically contains nanocomposite particles containing a siloxane bond formed by hydrolysis of the alkoxysilane.

The nanocomposite particles preferably contain Si atoms derived from the siloxane bond formed by hydrolysis of the alkoxysilane in an amount of 1% by mass or more, more preferably 5 to 99% by mass, in $SiO_2$ equivalent.

In order to achieve excellent antifogging performance, weather resistance, and adhesion to a substrate, the liquid composition of the invention preferably contains 0.5 to 25% by mass, more preferably 1 to 20% by mass, still more preferably 2 to 15% by mass, of the nanocomposite particles.

The liquid composition of the invention preferably contains a solvent. The nanocomposite particles in the liquid composition of the invention are typically dissolved or dispersed in a solvent.

The solvent to be used in the liquid composition of the invention may be any solvent having good affinity with the nanocomposite particles. One solvent may be used, or a mixture of two or more solvents may be used.

The solvent is preferably one or both of water and an organic solvent. Examples of the organic solvent include esters such as ethyl acetate, butyl acetate, isopropyl acetate, isobutyl acetate, cellosolve acetate, and propylene glycol methyl ether acetate; ketones such as acetone, methyl ethyl ketone, methyl isobutyl ketone, and cyclohexanone; cyclic ethers such as tetrahydrofuran and dioxane; amides such as N,N-dimethyl formamide and N,N-dimethyl acetamide; aromatic hydrocarbons such as toluene and xylene; alcohols such as methanol, ethanol, 1-propanol, 2-propanol, 1-butanol, 2-butanol, isobutyl alcohol, tert-butyl alcohol, and propylene glycol methyl ether; hydrocarbons such as hexane and heptane; and mixtures of any of these solvents.

In order to reduce the time for drying the liquid composition of the invention to form a film, the solvent preferably has a boiling point of 250° C. or lower, more preferably 200° C. or lower, still more preferably 120° C. or lower.

The solvent is preferably an alcohol, and specifically preferably include at least one selected from the group consisting of methanol, ethanol, 1-propanol, 2-propanol, 1-butanol, 2-butanol, isobutyl alcohol, and tert-butyl alcohol. The liquid composition of the invention may contain both an alcohol and water as solvents.

The liquid composition of the invention may contain a component other than the nanocomposite particles and the solvent. For example, in order to impart other properties such as adhesiveness, a known resin coating material may be used in admixture with the components. Examples of the resin coating material include oily coating materials, lacquers, solvent-based synthetic resin coating materials (e.g., acrylic resin-based, epoxy resin-based, urethane resin-based, fluororesin-based, silicone-acrylic resin-based, alkyd resin-based, aminoalkyd resin-based, vinyl resin-based, unsaturated polyester resin-based, or chlorinated rubber-based ones), aqueous synthetic resin coating materials (e.g., emulsion-based, aqueous resin-based), solvent-free synthetic resin coating materials (e.g., powdery coating materials), inorganic coating materials, and electrically insulated coating materials. Preferred among these resin coating materials are silicone-based resins and fluorine-based resins, as well as combined resin coating materials of silicone-based resin and fluorine-based resin.

Examples of the silicone-based resin include acryl-silicone resin, epoxy-silicone resin, and urethane-silicone resin containing 1 to 80% by mass of alkoxysilane, and/or organoalkoxysilane and hydrolyzed products thereof (polysiloxane), and/or colloidal silica, as well as silicone, and resin containing 1 to 80% by mass of alkoxysilane, and/or organoalkoxysilane and hydrolyzed products thereof (polysiloxane), and/or colloidal silica. These silicone-based resins each may be in the form of solution in a solvent, dispersion in a solvent, or powder, and may contain any of additives such as a cross-linking agent and a catalyst. Inorganic powder such as silica-based powder may be mixed therewith.

In order to improve the weather resistance and to reduce discoloration, the fluorine-based resin to be mixed may be a known fluorine-based resin that can dissolve in a solvent. The fluorine-based resin to be used may be a fluorine-based resin containing a curable functional group.

The liquid composition of the invention can suitably be produced by a production method using a solid acid catalyst to be described later. For example, if ammonia is used as a catalyst in production of a liquid composition and thereby the liquid composition contains ammonia, the catalyst alone is difficult to remove. Thus, this method is not suitable. On the contrary, the use of a solid acid catalyst as a catalyst in production of a liquid composition enables easy removal of the catalyst alone. Such a liquid composition can therefore suitably be used as a coating material. The liquid composition of the invention is preferably a coating material.

The invention also relates to a film obtainable from the liquid composition. The film obtainable from the liquid composition of the invention has excellent antifogging performance and weather resistance.

The invention also relates to a film containing nanocomposite particles, the nanocomposite particles containing metal particles and a perfluorocarbon sulfonic acid resin or a sulfonic acid salt resin thereof, the film having a mass ratio (F/S) of the fluorine element content to the sulfur element content of 10 to 50, the mass ratio being determined by energy dispersive X-ray spectroscopy. The film is obtainable from the liquid composition.

The film of the invention contains the nanocomposite particles and has a mass ratio (F/S) of 10 to 50, and thus has excellent antifogging performance and weather resistance. The film also exhibits excellent adhesion to a substrate.

The mass ratio (F/S) is more preferably 10 to 40, still more preferably 10 to 30.

The mass ratio (F/S) is a value determined by energy dispersive X-ray spectrometry (EDX).

The film of the invention preferably has a thickness of 0.1 µm greater, more preferably 1 µm or greater, although not limited thereto. The thickness is preferably 100 µm or smaller, more preferably 50 µm or smaller.

The film of the invention preferably has a contact angle of 80 degrees or greater. The film having a contact angle of 80 degrees or greater can have excellent antifogging performance and weather resistance. The contact angle is more preferably 90 degrees or greater, still more preferably 95 degrees or greater, particularly preferably 105 degrees or greater. The upper limit of the contact angle may be, but is not limited to, 125 degrees.

The contact angle is a value measured using a contact angle meter.

The film of the invention is obtainable from the liquid composition. Specifically, the film is obtainable by applying the liquid composition to a substrate and optionally drying the liquid composition.

The liquid composition may be applied to a substrate by any method such as brush coating, roller coating, spray coating, dip (immersion) coating, or any other conventionally known method. The method of applying the liquid composition in the invention is not limited to these examples.

The drying may be performed by any method such as hot-air drying, natural drying, or any other conventionally known method. The method of drying the liquid composition in the invention is not limited to these examples.

Examples of the substrate include glass, metal, wood, concrete, and plastic. Examples of the metal include aluminum, stainless steel, and iron.

In order to achieve excellent adhesion between the film and a substrate, the substrate is preferably glass or aluminum, more preferably glass.

In an aspect, the invention relates to a laminate including the film on a substrate.

The liquid composition of the invention is suitable as a coating material, and the coating material may be used for any application. Still, since the resulting film has excellent antifogging performance and weather resistance and exhibits excellent adhesion to a substrate, the coating material is particularly suitably used for applications such as a coating material for eyeglass lenses, a coating material for production of agricultural films (e.g., a coating material for agricultural plastic houses), and a coating material for camera lenses. In addition to the applications as coating materials, the liquid composition of the invention may be used as an additive for resin, for example.

A method for producing the liquid composition of the invention (hereinafter, also referred to as a "first production method of the invention") includes forming a liquid composition containing nanocomposite particles by mixing metal particles, a perfluorocarbon sulfonic acid resin or a sulfonic acid salt resin thereof, an alkoxysilane, and at least one catalyst selected from the group consisting of solid acid catalysts other than the perfluorocarbon sulfonic acid resin and the metal particles, acid compounds, and alkali compounds, the perfluoro sulfonic acid resin having an equivalent weight of 550 to 800.

This production method enables production of a liquid composition containing nanocomposite particles that contain the metal particles and the perfluorocarbon sulfonic acid resin having an equivalent weight of 550 to 800.

The formation of the liquid composition is typically performed with the use of a solvent. Examples of the solvent include solvents to be used for the above liquid composition.

In the case of using a solvent in the formation, the perfluorocarbon sulfonic acid resin or the sulfonic acid salt resin thereof is preferably soluble in the solvent. The catalyst is preferably insoluble in the solvent.

In the first production method of the invention, the metal particles and the perfluorocarbon sulfonic acid resin or the sulfonic acid salt resin thereof are the same as those described for the above liquid composition.

In the first production method of the invention, the perfluorocarbon sulfonic acid resin or the sulfonic acid salt resin thereof is preferably present in an amount (solid content) of 0.2 to 50 g, more preferably 0.5 to 10 g, per 1 g of the metal particles (solid content).

In the formation of the liquid composition, the metal particles used may be dispersed in a solvent to be present in the form of a sol.

In the formation of the liquid composition, the perfluorocarbon sulfonic acid resin or the sulfonic acid salt resin thereof used is preferably dissolved in a solvent to be present in the form of a solution.

Examples of the alkoxysilane include monoalkoxysilanes, dialkoxysilanes, trialkoxysilanes, and tetraalkoxysilanes. In order to achieve good reaction stability, tetraethoxysilane is preferred.

In the formation of the liquid composition, the alkoxysilane is preferably present in an amount of 50 to 1000 parts by mass, more preferably 200 to 700 parts by mass, relative to 100 parts by mass of the metal particles (solid content).

The catalyst includes at least one selected from the group consisting of solid acid catalysts other than the perfluorocarbon sulfonic acid resin and the metal particles, acid compounds, and alkali compounds. The presence of the catalyst enables smooth progress of hydrolysis of the alkoxysilane and dehydrofluorination of the perfluorocarbon sulfonic acid resin, resulting in efficient formation of the nanocomposite particles.

If ammonia is used as a catalyst, for example, the resulting liquid composition is to contain ammonia and generates gel. Thus, the liquid composition is not suitable as a coating material. On the contrary, the above catalyst generates no gel which may be generated when ammonia is used.

The solid acid catalysts other than the perfluorocarbon sulfonic acid resin and the metal particles each typically exhibit properties of a BrØnsted acid or a Lewis acid, and exhibit catalytic effects based on the acidity thereof.

The solid acid catalyst is preferably a carbon-based solid acid catalyst. In order to efficiently produce the liquid composition and to improve the antifogging performance, the weather resistance, and the adhesion to a substrate of the film obtainable from the liquid composition, the carbon-based solid acid catalyst is preferably an ion-exchange polymer, more preferably an acid-form ion-exchange polymer. The acid-form ion-exchange polymer may be, but is not limited to, a conventionally known acid-form ion-exchange polymer. Specific examples thereof include Amberlite available from Organo Corp., DIAION available from Mitsubishi Chemical Corp., and DOWEX available from The Dow Chemical Co.

The solid acid catalyst may have an average particle size of 0.05 to 5 mm, preferably 0.1 to 1 mm, although not limited thereto. The average particle size of the solid acid catalyst is a value determined in conformity with sieving.

Examples of the acid compounds include hydrofluoric acid, hydrochloric acid, and sulfuric acid. In order to achieve good reaction stability, hydrochloric acid is preferred.

Examples of the alkali compounds include sodium hydroxide and potassium hydroxide. In order to achieve good reaction stability, sodium hydroxide is preferred.

In the formation of the liquid composition, the catalyst is preferably present in an amount of 20 to 1000 parts by mass, more preferably 100 to 500 parts by mass, relative to 100 parts by mass of the alkoxysilane.

In the case of using a solvent in the formation of the liquid composition, the components mixed preferably have a mass ratio (metal particles:alkoxysilane:perfluorocarbon sulfonic acid resin or sulfonic acid salt resin thereof:catalyst:solvent) of 1:(0.5 to 10):(0.2 to 50):(0.1 to 100):(5 to 500), more preferably 1:(2 to 7):(0.5 to 10):(0.5 to 50):(10 to 200).

The metal particles, the perfluorocarbon sulfonic acid resin or the sulfonic acid salt resin thereof, the alkoxysilane, and the catalyst may be mixed by any method. An example thereof is a method of stirring the components in a container. The stirring is preferably performed at a rate of 200 rpm or higher, more preferably 500 rpm or higher.

In the formation of the liquid composition, preferably, the alkoxysilane is hydrolyzed and the metal particles are surface-treated with the perfluorocarbon sulfonic acid resin or the sulfonic acid salt resin thereof.

The formation of the liquid composition is preferably performed at a reaction temperature of −5° C. to 50° C., more preferably 0° C. to 30° C. A reaction temperature of lower than −5° C. may cause slow hydrolysis of the alkoxysilane. A reaction temperature of higher than 50° C. may cause poor stability of the nanocomposite particles.

The formation of the liquid composition may preferably be performed for 1 to 72 hours, more preferably 3 to 24 hours, although not limited thereto.

The formation of the liquid composition is preferably performed in an alcohol. The formation in an alcohol enables smooth progress of hydrolysis of the alkoxysilane and dehydrofluorination of the perfluorocarbon sulfonic acid resin or the sulfonic acid salt resin thereof, resulting in efficient formation of the nanocomposite particles. The alcohol to be used in the formation of the liquid composition is the same as the alcohol that may be contained in the liquid composition.

The first production method of the invention may include removing the catalyst from the liquid composition after the formation of the liquid composition. The removal of the catalyst may be performed by any method, such as filtration.

The nanocomposite particles preferably contain the metal particles and the perfluorocarbon sulfonic acid resin or the sulfonic acid salt resin thereof. The nanocomposite particles preferably have an average particle size of 15 to 100 nm. The nanocomposite particles are the same as those described for the liquid composition.

Another method for producing the liquid composition of the invention (hereinafter, also referred to as a "second production method of the invention") includes forming a liquid composition containing a nanocomposite particle precursor by mixing metal particles, a perfluorocarbon sulfonic acid resin or a sulfonic acid salt resin thereof, an alkoxysilane, and at least one catalyst selected from the group consisting of solid acid catalysts other than the perfluorocarbon sulfonic acid resin and the metal particles, acid compounds, and alkali compounds, and performing ion exchange on the perfluorocarbon sulfonic acid resin in the nanocomposite particle precursor to form a liquid composition containing nanocomposite particles, the perfluorocarbon sulfonic acid resin having an equivalent weight of 550 to 800.

The formation of the liquid composition containing the nanocomposite particle precursor can be performed in the same manner as in the formation of the liquid composition containing nanocomposite particles in the first production method of the invention.

In other words, the formation of the liquid composition containing a nanocomposite particle precursor is preferably performed in an alcohol.

In the formation of the liquid composition containing a nanocomposite particle precursor, preferably, the alkoxysilane is hydrolyzed and the metal particles are surface-treated with the perfluorocarbon sulfonic acid resin or the sulfonic acid salt resin thereof.

The nanocomposite particles preferably have an average particle size of 15 to 100 nm.

In the second production method of the invention, the nanocomposite particles preferably contain the metal particles and a perfluorocarbon sulfonic acid salt resin. The nanocomposite particles containing the perfluorocarbon sulfonic acid salt resin have higher water absorbency than those containing the perfluorocarbon sulfonic acid resin, and thus can further improve the antifogging performance of the film obtainable from the liquid composition.

The nanocomposite particle precursor preferably contains the metal particles and the perfluorocarbon sulfonic acid resin.

The ion exchange of the perfluorocarbon sulfonic acid resin in the second production method of the invention may be performed by any method, such as a method including adding an ion-exchange polymer to the liquid composition containing the nanocomposite particle precursor, and stirring the components.

The ion-exchange polymer may be a conventionally known ion-exchange polymer, such as a Na-form ion-exchange polymer, a K-form ion-exchange polymer, or any other cation-exchange polymer.

EXAMPLES

The present embodiment is described more specifically with reference to examples and comparative examples. The present embodiment is not limited to these examples without departing from the spirit of the invention.

(Measurement of Equivalent Weight EW of Perfluorocarbon Sulfonic Acid Resin)

About 0.3 g of a perfluorocarbon sulfonic acid resin was immersed in 30 mL of a saturated NaCl aqueous solution at 25° C. and left for 30 minutes under stirring. The protons in the saturated NaCl aqueous solution were subjected to neutralization titration using a 0.01 N sodium hydroxide aqueous solution with phenolphthalein serving as an indicator. The perfluorocarbon sulfonic acid resin which was obtained after the neutralization and contained sodium ions as the counterions of the ion-exchange groups was rinsed with pure water, dried in vacuo, and weighed. The equivalent weight EW (g/eq) was calculated by the following formula:

$$EW=(w/M)-22$$

wherein M represents the amount (mmol) of sodium hydroxide used for neutralization; and w represents the mass (mg) of the perfluorocarbon sulfonic acid resin containing sodium ions as the counterions of the ion-exchange groups.

(Measurement of Average Particle Size of Silica Particles)

The average particle size of Methanol Silica Sol (available from Nissan Chemical Corp.) was measured using a particle size distribution analyzer Nanotrac Wave (Model: Nanotrac Wave-EX150, available from MicrotracBEL Corp.). Specifically, the measurement sample charged in a sample cell was irradiated with a semiconductor laser having a wavelength of 780 nm at 3 to 5 mW for a measurement duration of 300 seconds, whereby the average particle size of the sample was measured.

(Measurement of Average Particle Size of Nanocomposite Particles)

The average particle size of the liquid composition produced by the method described in each example was measured using a particle size distribution analyzer Nanotrac Wave (Model: Nanotrac Wave-EX150, available from MicrotracBEL Corp.). Specifically, the measurement sample charged in a sample cell was irradiated with a semiconductor laser having a wavelength of 780 nm at 3 to 5 mW for a measurement duration of 300 seconds, whereby the average particle size of the sample was measured.

(Mass Ratio (F/S) of Fluorine Element Content to Sulfur Element Content in Film)

The liquid composition produced by the method described in each example was applied to an aluminum plate, and the elemental analysis was performed on the liquid composition at an accelerating voltage of 15 kV and a degree of vacuum of $1\times10^{-7}$ Pa using EDX (Model: XFlash 6160, available from Brukar), whereby the mass ratio (F/S) was determined.

(Contact Angle)

The liquid composition produced by the method described in each example was applied to glass, and the contact angle was measured using an automatic contact angle meter (Model: DropMaster700, available from Kyowa Interface Science, Inc.).

Preparation Example 1: Production of Aqueous Solution of Perfluorocarbon Sodium Sulfonate Resin A perfluorocarbon sodium sulfonate resin solution used in Examples 1, 2, and 5 to 8 and Comparative Example 2 was obtained as follows. First, polymerization, hydrolysis, and ultrafiltration disclosed in Example 1 of WO 2011/034179 were performed to provide a Na-form emulsion, and then the resulting Na-form emulsion was subjected to dissolution disclosed in Example 1 of WO 2015/002073.

Example 1

A sample bottle was charged with 10 mL of isopropyl alcohol, then with 0.25 mL of a solution containing silica particles (average particle size: 24 nm) dispersed at a solid content of 30% by weight in methanol and 0.25 mL of tetraethoxysilane, and the components were stir-mixed at room temperature.

Then, 1 g of the perfluorocarbon sodium sulfonate resin solution (solid content: 25% by weight, EW: 719) prepared in Preparation Example 1 was put thereinto under stirring. Further, 1 g of a H-form ion-exchange resin (trade name: Amberlite IR-120B H, available from Organo Corp.) was put thereinto, and the components were stirred at a stirring rate of 900 rpm for 12 hours.

The mass ratio of the silica particles, tetraethoxysilane, perfluorocarbon sodium sulfonate, and H-form ion-exchange resin added in the present example (silica particles:tetraethoxysilane:perfluorocarbon sodium sulfonate:H-form ion-exchange resin) was 1:3.3:3.3:13.3.

The stirring was followed by removal of Amberlite by filtration, whereby a liquid composition containing nanocomposite particles that contain silica and the perfluorocarbon sulfonic acid resin was obtained.

The resulting nanocomposite particles had an average particle size of 48 nm.

Example 2

A sample bottle was charged with 10 mL of ethanol, then with 0.25 mL of a solution containing silica particles (average particle size: 24 nm) dispersed at a solid content of 30% by weight in methanol and 0.25 mL of tetraethoxysilane, and the components were stir-mixed at room temperature.

Then, 1.3 g of the perfluorocarbon sodium sulfonate resin solution (solid content: 20% by weight, EW: 617) prepared in Preparation Example 1 was put thereinto under stirring. Further, 1 g of a H-form ion-exchange resin (trade name: Amberlite IR-120B H, available from Organo Corp.) was put thereinto, and the components were stirred at a stirring rate of 900 rpm for 12 hours.

The mass ratio of the silica particles, tetraethoxysilane, perfluorocarbon sodium sulfonate, and H-form ion-exchange resin added in the present example (silica particles:tetraethoxysilane:perfluorocarbon sodium sulfonate:H-form ion-exchange resin) was 1:3.3:3.5:13.3.

The stirring was followed by removal of Amberlite by filtration, whereby a liquid composition containing nanocomposite particles that contain silica and the perfluorocarbon sulfonic acid resin was obtained.

The resulting nanocomposite particles had an average particle size of 45 nm.

Example 3

A sample bottle was charged with 10 g of the liquid composition obtained in Example 1, then with a Na-form ion-exchange resin (trade name: Amberlite IR-120B Na, available from Organo Corp.), and the components were stirred at room temperature for 12 hours. Thereby, a liquid composition containing nanocomposite particles that contain a perfluorocarbon sodium sulfonate resin was obtained.

The resulting nanocomposite particles had an average particle size of 35 nm.

Example 4

A sample bottle was charged with 10 g of the liquid composition obtained in Example 2, then with a Na-form ion-exchange resin (trade name: Amberlite IR-120B Na, available from Organo Corp.), and the components were stirred at room temperature for 12 hours. Thereby, a liquid composition containing nanocomposite particles that contain a perfluorocarbon sodium sulfonate resin was obtained.

The resulting nanocomposite particles had an average particle size of 34 nm.

Example 5

A sample bottle was charged with 10 g of the liquid composition obtained in Example 1, then with 0.015 mL of a 10% by weight aqueous solution of lithium chloride (available from Aldrich). Then, the solution in the sample bottle was stirred for three hours in a 45° C. water bath, whereby a liquid composition containing nanocomposite particles that contain a perfluorocarbon lithium sulfonate resin was obtained.

Example 6

A sample bottle was charged with 10 mL of isopropyl alcohol, then with 0.2 mL of a solution containing silica particles (average particle size: 24 nm) dispersed at a solid content of 30% by weight in methanol, 0.15 mL of tetraethoxysilane, and 0.03 mL of triethoxy(3-glycidyloxypropyl)silane (Tokyo Chemical Industry Co., Ltd.), and the components were stir-mixed at room temperature. Then, 1 g of the perfluorocarbon sodium sulfonate resin solution (solid content: 25% by weight, EW: 719) prepared in Preparation Example 1 was put thereinto under stirring. Further, 0.5 mL of a 0.2 M hydrochloric acid aqueous solution was put thereinto and the components were stirred at a stirring rate of 900 rpm for 12 hours. Thereby, a liquid composition containing nanocomposite particles that contain a perfluorocarbon sodium sulfonate resin was obtained.

The resulting nanocomposite particles had an average particle size of 53 nm.

Example 7

A liquid composition containing nanocomposite particles that contain a perfluorocarbon sodium sulfonate resin was obtained in the same manner as in Example 6, except that 3-[diethoxy(methyl)silyl]propyl methacrylate (available from Tokyo Chemical Industry Co., Ltd.) was used instead of triethoxy(3-glycidyloxypropyl)silane.

The resulting nanocomposite particles had an average particle size of 32 nm.

Example 8

A sample tube was charged with 2 g of a 2.5% by weight aqueous solution of polyvinyl alcohol (available from Aldrich, Mw: 89000 to 98000, degree of saponification: 99% or higher), then with 2 mL of ethanol and 2 mL of deionized water at room temperature. Then, 0.25 mL of a solution containing silica particles (average particle size: 24 nm) dispersed at a solid content of 30% by weight in methanol and 0.25 mL of tetraethoxysilane were put thereinto, and the components were stir-mixed. Further, 1 g of a perfluorocarbon sodium sulfonate resin solution (solid content: 25% by weight, EW: 719) prepared in Preparation Example 1 and 0.5 mL of a 0.2 M hydrochloric acid aqueous solution were put thereinto under stirring, and the components were stirred at a stirring rate of 900 rpm for 12 hours. Thereby, a liquid composition containing nanocomposite particles that contain a perfluorocarbon sodium sulfonate resin was obtained.

The resulting nanocomposite particles had an average particle size of 18 nm.

Comparative Example 1

A sample bottle was charged with 10 mL of isopropyl alcohol, then with 0.25 mL of a solution containing silica particles (average particle size: 24 nm) dispersed at a solid content of 30% by weight in methanol and 0.25 mL of tetraethoxysilane, and the components were stir-mixed at room temperature.

Then, 1.3 g of a Nafion® dispersion (available from Aldrich, solid content: 20%, EW: 1100) was put thereinto under stirring. Further, 1 g of a H-form ion-exchange resin (trade name: Amberlite IR-120B H, available from Organo Corp.) was put thereinto, and the components were stirred at a stirring rate of 900 rpm for 12 hours. The mass ratio of the silica particles, tetraethoxysilane, perfluorocarbon sodium sulfonate, and H-form ion-exchange resin added in the present example (silica particles:tetraethoxysilane:perfluorocarbon sodium sulfonate:H-form ion-exchange resin) was 1:3.3:3.5:13.3.

The stirring was followed by removal of Amberlite by filtration, whereby a liquid composition containing nanocomposite particles that contain silica and the perfluorocarbon sulfonic acid resin was obtained.

The resulting nanocomposite particles had an average particle size of 33 nm.

Comparative Example 2

A sample bottle was charged with 10 mL of ethanol, then with 0.25 mL of a solution containing silica particles (average particle size: 24 nm) dispersed at a solid content of 30% by weight in methanol and 0.25 mL of tetraethoxysilane, and the components were stir-mixed at room temperature.

Then, 2.5 g of the perfluorocarbon sodium sulfonate resin solution (solid content: 10% by weight, EW: 952) prepared in Preparation Example 1 was put thereinto under stirring. Further, 1 g of a H-form ion-exchange resin (trade name: Amberlite IR-120B H, available from Organo Corp.) was put thereinto, and the components were stirred at a stirring rate of 900 rpm for 12 hours. The stirring was followed by removal of Amberlite by filtration, whereby a liquid composition containing nanocomposite particles that contain silica and the perfluorocarbon sulfonic acid resin was obtained.

The resulting nanocomposite particles had an average particle size of 36 nm.

Each of the composite solutions obtained in the examples and the comparative examples and LAMBIC-1000W (available from Osaka Organic Chemical Industry Ltd.), which is a hydrocarbon-based hydrophilic agent, as a control were applied to glass using a bar coater. Each workpiece was dried by hot air at 90° C. for 20 minutes in a hot-air dryer, whereby the glass was surface-treated and a film was formed on the glass substrate.

For the substrate having an antifogging surface on which the film was formed, the specific physical properties including the antifogging performance, the water resistance, the acid resistance, the weather resistance, and the heat resistance were evaluated based on the following criteria.

(Antifogging Evaluation)

The substrate was placed above the surface of 60° C. warm water such that the coated surface faced the water surface at a distance of 5 cm, and the period of time until the substrate surface started to fog was measured.

Good: The time until the surface started to fog was not shorter than 30 seconds.

Acceptable: The time until the surface started to fog was not shorter than 10 seconds but shorter than 30 seconds.

Poor: The time until the surface started to fog was shorter than 10 seconds.

TABLE 1

| Liquid composition | Antifogging evaluation |
| --- | --- |
| LAMBIC-1000W | Good |
| Example 1 (EW719) | Acceptable |
| Example 2 (EW617) | Good |
| Example 3 (EW719) | Good |
| Example 4 (EW617) | Good |
| Example 5 (EW719) | Good |
| Example 6 (EW719) | Acceptable |
| Example 7 (EW719) | Acceptable |
| Example 8 (EW719) | Good |
| Comparative Example 1 | Poor |
| Comparative Example 2 | Poor |

(Water Resistance Evaluation)

The substrate was immersed in water at room temperature for seven days. The immersion was followed by the antifogging evaluation, and then the water resistance was evaluated in conformity with the antifogging evaluation under the same conditions as described above.

Good: The substrate did not fog.
Poor: The substrate fogged.

(Acid Resistance Evaluation)

The substrate was immersed in a 0.5% nitric acid aqueous solution at room temperature for five hours. The immersion was followed by the antifogging evaluation, and the acid resistance was evaluated in conformity with the antifogging evaluation under the same conditions as described above.

Good: The substrate did not fog.
Poor: The substrate fogged.

(Weather Resistance Evaluation)

A test was performed under the following conditions using Metal Weather cycle test equipment. The test was followed by the antifogging evaluation, and the weather resistance was evaluated in conformity with the antifogging evaluation under the same conditions as described above.

Test Conditions (10 Cycles)

L: irradiation (63 mW/cm$^2$), temperature 65° C., humidity 70%, 16 hours→R: temperature 65° C., humidity 70%, 2 hours→shower→D: temperature 30° C., humidity 98%, 6 hours→shower→L Good: The substrate did not fog.
Poor: The substrate fogged.

(Heat Resistance Evaluation)

The substrate was placed in a constant temperature chamber set to 120° C. and left for 240 hours. Then, the substrate was taken out of the constant temperature chamber. The substrate was left at room temperature for an hour, and the heat resistance was evaluated in conformity with the anti-fogging test under the same conditions as described above.

Good: The substrate did not fog.
Poor: The substrate fogged.

TABLE 2

| | LAMBIC-1000W | Example 1 (EW719) | Example 2 (EW617) | Example 5 (EW719) | Example 8 (EW719) |
| --- | --- | --- | --- | --- | --- |
| Water resistance | Good | Good | Good | Good | Good |
| Acid resistance | Good | Good | Good | Good | Good |
| Weather resistance | Poor | Good | Good | Good | Poor |
| Heat resistance | Poor | Poor | Poor | Good | Poor |

The mass ratio (F/S) of the fluorine element content to the sulfur element content in the film and the contact angle were determined by the aforementioned methods.

TABLE 3

| | Mass proportion of atom | | Mass ratio |
| --- | --- | --- | --- |
| | F | S | F/S |
| Example 1 (EW719) | 50.3 | 2.3 | 21.9 |
| Example 2 (EW617) | 49.7 | 2.3 | 21.6 |
| Comparative Example 1 | 40.9 | 0.6 | 68.2 |

TABLE 4

| | Contact angle (average) |
| --- | --- |
| Glass | 67.3 |
| Example 1 (EW719) | 115.0 |
| Example 2 (EW617) | 113.3 |
| Comparative Example 1 | 104.2 |

The invention claimed is:

1. A liquid composition comprising nanocomposite particles,
   the nanocomposite particles containing metal particles and a sulfonic acid salt resin of a perfluorocarbon sulfonic acid resin,
   the sulfonic acid salt resin being a salt obtained by replacing a hydrogen ion of a sulfonic acid group by a cation,
   the cation being at least one selected from the group consisting of Na+ and Li+,
   the perfluorocarbon sulfonic acid resin having an equivalent weight of 550 to 800, and
   the nanocomposite particles having an average particle size of 15 to 100 nm.

2. The liquid composition according to claim 1,
   wherein the perfluorocarbon sulfonic acid resin is a copolymer containing:
   a polymerized unit represented by —(CF$_2$—CFZ)—, wherein Z is H, Cl, F, or a C1-C3 perfluoroalkyl group; and
   a polymerized unit represented by —(CF$_2$—CF(—O—(CF$_2$)$_m$—SO$_3$H))—, wherein m is an integer of 1 to 12.

3. The liquid composition according to claim 1, further comprising an alcohol.

4. The liquid composition according to claim 1,
   wherein the liquid composition is a coating material.

5. A film comprising the liquid composition according to claim 1.

6. A method for producing the liquid composition comprising nanocomposite particles according to claim 1, the method comprising
mixing the metal particles, the sulfonic acid salt resin of a perfluorocarbon sulfonic acid resin, an alkoxysilane, and at least one catalyst selected from the group consisting of solid acid catalysts other than the perfluorocarbon sulfonic acid resin and the metal particles, acid compounds, and alkali compounds.

7. The production method according to claim 6,
wherein, the alkoxysilane is hydrolyzed and the metal particles are surface-treated with the sulfonic acid salt resin of a perfluorocarbon sulfonic acid resin.

8. The production method according to claim 6,
wherein the mixing is performed in an alcohol.

9. The production method according to claim 6,
wherein the nanocomposite particles contain the metal particles and the sulfonic acid salt resin of a perfluorocarbon sulfonic acid resin.

10. The production method according to claim 6,
wherein the nanocomposite particles have an average particle size of 15 to 100 nm.

11. A method for producing the liquid composition comprising nanocomposite particles according to claim 1, the method comprising:
forming a liquid composition containing a nanocomposite particle precursor by mixing the metal particles, the sulfonic acid salt resin of a perfluorocarbon sulfonic acid resin, an alkoxysilane, and at least one catalyst selected from the group consisting of solid acid catalysts other than the sulfonic acid salt resin of a perfluorocarbon sulfonic acid resin and the metal particles, acid compounds, and alkali compounds; and
performing ion exchange on the sulfonic acid salt resin of a perfluorocarbon sulfonic acid resin in the nanocomposite particle precursor to form a liquid composition containing nanocomposite particles.

12. The production method according to claim 11,
wherein in the formation of the liquid composition containing the nanocomposite particle precursor, the alkoxysilane is hydrolyzed and the metal particles are surface-treated with the sulfonic acid salt resin of a perfluorocarbon sulfonic acid resin.

13. The production method according to claim 11,
wherein the formation of the liquid composition containing the nanocomposite particle precursor is performed in an alcohol.

14. The production method according to claim 11,
wherein the nanocomposite particles contain the metal particles and the sulfonic acid salt resin of a perfluorocarbon sulfonic acid salt resin.

* * * * *